United States Patent
Nakashima et al.

(10) Patent No.: US 10,988,609 B2
(45) Date of Patent: Apr. 27, 2021

(54) NITRILE GROUP-CONTAINING HIGHLY SATURATED COPOLYMER RUBBER COMPOSITION

(71) Applicant: ZEON CORPORATION, Tokyo (JP)

(72) Inventors: Tomonori Nakashima, Tokyo (JP); Chikara Katano, Tokyo (JP); Masato Sakamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/404,431

(22) Filed: May 6, 2019

(65) Prior Publication Data

US 2019/0284386 A1    Sep. 19, 2019

Related U.S. Application Data

(63) Continuation of application No. 14/234,367, filed as application No. PCT/JP2012/069003 on Jul. 26, 2012, now abandoned.

(30) Foreign Application Priority Data

Jul. 28, 2011    (JP) .............................. JP2011-165483

(51) Int. Cl.
   *C08L 33/20*    (2006.01)
   *C08K 7/02*     (2006.01)
   *C08K 5/098*    (2006.01)

(52) U.S. Cl.
   CPC .............. *C08L 33/20* (2013.01); *C08K 5/098* (2013.01); *C08K 7/02* (2013.01)

(58) Field of Classification Search
   CPC ........... C08L 33/18; C08L 33/20; C08L 33/22
   USPC ....................................... 525/132
   See application file for complete search history.

(56) References Cited

U.S. PATENT DOCUMENTS

| | | |
|---|---|---|
| 4,689,290 A | 8/1987 | Worns |
| 6,489,385 B1 | 12/2002 | Fujii et al. |
| 2004/0127647 A1 | 7/2004 | Ong et al. |
| 2005/0043486 A1 | 2/2005 | Okuno |
| 2007/0197688 A1 | 8/2007 | Tsukada et al. |
| 2007/0208136 A1 | 9/2007 | Nasreddine et al. |
| 2008/0033089 A1 | 2/2008 | Ellul et al. |
| 2010/0104789 A1 | 4/2010 | Imada et al. |
| 2010/0330319 A1 | 12/2010 | Tsukada et al. |

FOREIGN PATENT DOCUMENTS

| | | |
|---|---|---|
| DE | 10 2006 056 718 A1 | 6/2008 |
| EP | 0 972 797 A1 | 1/2000 |
| EP | 1 188 790 A1 | 3/2002 |
| JP | S61-292635 A | 12/1986 |
| JP | H04-277538 A | 10/1992 |
| JP | H06-145424 A | 5/1994 |
| JP | H08-239484 A | 9/1996 |
| JP | 2003-314619 A | 11/2003 |
| JP | 2006-503129 A | 1/2006 |
| WO | 97/36956 A1 | 10/1997 |
| WO | 98/44036 A1 | 10/1998 |
| WO | 2005/092971 A1 | 10/2005 |

OTHER PUBLICATIONS

Nov. 14, 2019 Office Action issued in European Patent Application No. 12817925.6.
Nov. 13, 2012 International Search Report issued in International Patent Application No. PCT/JP2012/069003.
Feb. 3, 2021 Office Action issued in European Application No. 12 817 925.6.

*Primary Examiner* — Michael M Dollinger
(74) *Attorney, Agent, or Firm* — Oliff PLC

(57) ABSTRACT

A nitrile group-containing highly saturated copolymer rubber composition containing a nitrile group-containing highly saturated copolymer rubber (A) having a Mooney viscosity [$ML_{1+4}$, 100° C.] of 50 to 200, a nitrile group-containing highly saturated copolymer rubber (B) having a Mooney viscosity [$ML_{1+4}$, 100° C.] of 5 to 45, and staple fibers (C) having an average fiber length of 0.1 to 12 mm is provided. According to the present invention, a nitrile group-containing highly saturated copolymer rubber composition which can give cross-linked rubber which is extremely high in tensile stress and is excellent in low heat buildup property and has good workability can be provided.

13 Claims, No Drawings

NITRILE GROUP-CONTAINING HIGHLY SATURATED COPOLYMER RUBBER COMPOSITION

TECHNICAL FIELD

The present invention relates to a nitrile group-containing highly saturated copolymer rubber composition, more specifically relates to a nitrile group-containing highly saturated copolymer rubber composition which can give cross-linked rubber which is extremely high in tensile stress and excellent in low heat buildup property and which has excellent workability.

BACKGROUND ART

A nitrile group-containing highly saturated copolymer rubber represented by hydrogenated acrylonitrile-butadiene copolymer rubber is more excellent in heat resistance, oil resistance, ozone resistance, etc. compared with acrylonitrile-butadiene copolymer rubber and other general nitrile group-containing copolymer rubber which have many carbon-carbon unsaturated bonds in the main chain structure, so is being often used for various fuel oil hoses, O-rings, belts in oil, etc.

In recent years, the higher outputs of automobiles, the spread of FF configurations, measures against emissions, etc. have prompted various studies on increasing the performance of nitrile group-containing highly saturated copolymer rubber (high tensile stress and low heat buildup property).

In this regard, in the past, it has been known to add staple fibers in the rubber composition so as to improve the obtained cross-linked rubber in tensile strength, tensile stress or other mechanical properties.

For this reason, Patent Document 1 discloses to use a softener at the time of kneading the polymer and staple fibers so as to make the staple fibers disperse in the rubber composition. This art makes the softener permeate through the staple fibers to prevent the staple fibers from becoming entangled with each other and thereby improve the dispersability of the staple fibers in the rubber composition, but to make the softener sufficiently permeate through the staple fibers, a large amount of softener has to be mixed in.

Further, when using acrylonitrile-butadiene copolymer rubber and other relatively high polarity rubber, since the softener and the rubber are poor in solubility with each other, if mixing in a large amount of softener, bleeding ends up occurring and, further, the obtained cross-linked rubber also becomes insufficient for applications where higher performance is demanded.

Furthermore, Patent Document 2 discloses the art of jointly using a liquid rubber with a viscosity so low as to be unable to be measured by the Mooney viscosity measurement method ($[ML_{1+4}(100°\ C.)]$) (substantially 1 or less) and staple fibers, but in this case, the obtained cross-linked rubber is not sufficient in tensile stress and low heat buildup property.

PRIOR ART DOCUMENTS

Patent Documents

Patent Document 1: Japanese Patent Publication No. 8-239484A
Patent Document 2: WO2005/092971

SUMMARY OF THE INVENTION

Problem to be Solved by the Invention

The present invention has as its object to provide a nitrile group-containing highly saturated copolymer rubber composition which can give cross-linked rubber which is extremely high in tensile stress and excellent in low heat buildup property and which has excellent workability. Further, the present invention has as its object to provide a cross-linked rubber obtained by cross-linking such a nitrile group-containing highly saturated copolymer rubber composition.

Means For Solving the Problems

The present inventors engaged in intensive research to solve the above problems and a result discovered that the above objects can be achieved by a nitrile group-containing highly saturated copolymer rubber composition which contains a specific high Mooney viscosity nitrile group-containing highly saturated copolymer rubber, a specific low Mooney viscosity nitrile group-containing highly saturated copolymer rubber, and staple fibers having specific average fiber length and thereby completed the present invention.

That is, according to the present invention, there is provided a nitrile group-containing highly saturated copolymer rubber composition which contains a nitrile group-containing highly saturated copolymer rubber (A) having a Mooney viscosity $[ML_{1+4},\ 100°\ C.]$ of 50 to 200, a nitrile group-containing highly saturated copolymer rubber (B) having a Mooney viscosity $[ML_{1+4},\ 100°\ C.]$ of 5 to 45, and staple fibers (C) having an average fiber length of 0.1 to 12 mm.

In the nitrile group-containing highly saturated copolymer rubber composition of the present invention, preferably the nitrile group-containing highly saturated copolymer rubber (A) and the nitrile group-containing highly saturated copolymer rubber (B) both have iodine values of 120 or less.

Further, the nitrile group-containing highly saturated copolymer rubber composition of the present invention preferably contains a nitrile group-containing highly saturated copolymer rubber (B) in 5 to 75 wt % with respect 100 wt % of the total of the nitrile group-containing highly saturated copolymer rubber (A) and the nitrile group-containing highly saturated copolymer rubber (B).

Furthermore, the nitrile group-containing highly saturated copolymer rubber composition of the present invention preferably contains the staple fibers (C) in 0.1 to 50 parts by weight with respect to 100 parts by weight of the total of the nitrile group-containing highly saturated copolymer rubber (A) and the nitrile group-containing highly saturated copolymer rubber (B).

Further, the nitrile group-containing highly saturated copolymer rubber composition of the present invention further contains an $\alpha,\beta$-ethylenically unsaturated carboxylic acid metal salt (D).

Further, according to the present invention, there are provided a cross-linkable nitrile rubber composition which comprises the above nitrile group-containing highly saturated copolymer rubber composition in which a cross-linking agent is contained and a cross-linked rubber obtained by cross-linking the cross-linkable nitrile rubber composition.

Effects of the Invention

According to the present invention, it is possible to provide a nitrile group-containing highly saturated copolymer rubber composition which can give cross-linked rubber which is extremely high in tensile stress and excellent in low heat buildup property and which has excellent workability. Further, according to the present invention, it is possible to provide a cross-linked rubber obtained by cross-linking such a nitrile group-containing highly saturated copolymer rubber composition.

DESCRIPTION OF EMBODIMENTS

The nitrile group-containing highly saturated copolymer rubber composition of the present invention is comprised of a nitrile group-containing highly saturated copolymer rubber (A) having a Mooney viscosity [$ML_{1+4}$, 100° C.] of 50 to 200, a nitrile group-containing highly saturated copolymer rubber (B) having a Mooney viscosity [$ML_{1+4}$, 100° C.] of 5 to 45, and staple fibers (C) having an average fiber length of 0.1 to 12 mm.

Nitrile Group-Containing Highly Saturated Copolymer Rubber (A)

The nitrile group-containing highly saturated copolymer rubber (A) used in the present invention is rubber which has α,β-ethylenically unsaturated nitrile monomer units and has a Mooney viscosity [$ML_{1+4}$, 100° C.] of 50 to 200.

The α,β-ethylenically unsaturated nitrile monomer which forms the α,β-ethylenically unsaturated nitrile monomer units is not particularly limited so long as an α,β-ethylenically unsaturated compound which has nitrile groups. Acrylonitrile; α-chloroacrylonitrile, α-bromoacrylonitrile, and other α-halogenoacrylonitriles; methacrylonitrile, ethacrylonitrile, and other α-alkyl acrylonitriles; etc. may be mentioned. Among these, acrylonitrile and methacrylonitrile are preferable, and acrylonitrile is particularly preferable. Note that, the α,β-ethylenically unsaturated nitrile monomer may be used as a single type alone or as a plurality of types combined.

In the nitrile group-containing highly saturated copolymer rubber (A), the ratio of content of the α,β-ethylenically unsaturated nitrile monomer units is preferably 10 to 60 wt % in the total monomer units, more preferably 20 to 50 wt %. If the content of the α,β-ethylenically unsaturated nitrile monomer units is too small in content, the obtained cross-linked rubber tends to fall in oil resistance. On the other hand, if too large, the obtained cross-linked rubber tends to fall in cold resistance.

The nitrile group-containing highly saturated copolymer rubber (A) preferably has conjugated diene monomer units in addition to the α,β-ethylenically unsaturated nitrile monomer units from the viewpoint of the obtained cross-linked rubber expressing rubber elasticity.

As the conjugated diene monomers which forms the conjugated diene monomer units, 1,3-butadiene, isoprene, 2,3-dimethyl-1,3-butadiene, 1,3-pentadiene, chloroprene, and other diene monomers which have 4 to 6 carbon atoms are preferable, 1,3-butadiene and isoprene are more preferable, and 1,3-butadiene is particularly preferable. Note that, the conjugated diene monomers may be used as single types alone or as a plurality of types combined.

In the nitrile group-containing highly saturated copolymer rubber (A), the content of the conjugated diene monomer units is preferably 40 to 90 wt %, particularly preferably 50 to 80 wt %. If the content of the conjugated diene monomer units is too small, the obtained cross-linked rubber is liable to fall in rubber elasticity, while conversely if too large, the heat resistance and chemical stability may be impaired. Further, the above content of the conjugated diene monomer units is the content including the hydrogenated parts when performing the later explained hydrogenation.

The nitrile group-containing highly saturated copolymer rubber (A), together with further the α,β-ethylenically unsaturated nitrile monomer and conjugated diene monomer, may be copolymerized with other monomers which can be copolymerized with the same. As such other monomers, ethylene, an α-olefin monomer, a nonconjugated diene monomer, aromatic vinyl monomer, fluorine-containing vinyl monomer, α,β-ethylenically unsaturated monocarboxylic acid and its esters, α,β-ethylenically unsaturated polyvalent carboxylic acid, α,β-ethylenically unsaturated polyvalent carboxylic acid monoester and polyvalent ester, α,β-ethylenically unsaturated polyvalent carboxylic acid anhydride, cross-linkable monomer, copolymerizable anti-aging agent, etc. may be mentioned.

The α-olefin monomer is preferably one which has 3 to 12 carbon atoms, propylene, 1-butene, 4-methyl-1-pentene, 1-hexene, 1-octene, etc. may be mentioned.

The nonconjugated diene monomer is preferably one which has 5 to 12 carbon atoms, 1,4-pentadiene, 1,4-hexadiene, vinyl norbornene, dicyclopentadiene, etc. may be mentioned.

As the aromatic vinyl monomer, styrene, α-methylstyrene, vinyl pyridine, etc. may be mentioned.

As the fluorine-containing vinyl monomer, fluoroethylvinyl ether, fluoropropylvinyl ether, o-trifluoromethylstyrene, vinyl pentafluorobenzoate, difluoroethylene, tetrafluoroethylene, etc. may be mentioned.

As the α,β-ethylenically unsaturated monocarboxylic acid, for example, acrylic acid, methacrylic acid, crotonic acid, cinnamic acid, etc. may be mentioned. As the α,β-ethylenically unsaturated monocarboxylic acid ester, for example, ethyl (meth)acrylate (meaning ethyl acrylate or ethyl methacrylate, same below), butyl (meth)acrylate, 2-ethylhexyl (meth)acrylate, etc. may be mentioned.

As the α,β-ethylenically unsaturated polyvalent carboxylic acid, for example, maleic acid, fumaric acid, itaconic acid, etc. may be mentioned. As the α,β-ethylenically unsaturated polyvalent carboxylic acid monoester, for example, monomethyl maleate, monoethyl maleate, monocyclopentyl maleate, monoethyl itaconate, monomethylcyclopentyl itaconate, etc. may be mentioned.

As the α,β-ethylenically unsaturated polyvalent carboxylic acid polyvalent ester, for example, dimethyl maleate, di-n-butyl fumarate, dimethyl itaconate, di-2-ethylhexyl itaconate, etc. may be mentioned.

As the α,β-ethylenically unsaturated polyvalent carboxylic acid anhydride, for example, maleic acid anhydride, itaconic acid anhydride, etc. may be mentioned.

As the cross-linkable monomer, divinyl benzene and other divinyl compounds; a diethyleneglycol di(meth)acrylic acid ester, ethyleneglycol di(meth)acrylic acid ester, and other di(meth)acrylic acid esters; a trimethylol propanetri(meth) acrylic acid ester and other tri(meth)acrylic acid esters; and other polyfunctional ethylenically unsaturated monomers and also N-methylol(meth)acrylamide, N,N'-dimethylol (meth)acrylamide, and other self cross-linkable monomers etc. may be mentioned.

As the copolymerizable antiaging agent, N-(4-anilinophenyl)acrylamide, N-(4-anilinophenyl)methacrylamide, N-(4-anilinophenyl)cinnanamide, N-(4-anilinophenyl)crotonamide, N-phenyl-4-(3-vinyl benzyloxy)aniline, N-phenyl-4-(4-vinyl benzyloxy)aniline, etc. may be illustrated.

As these other copolymerizable monomers, a plurality of types may be used together.

The content of the other monomer units of the nitrile group-containing highly saturated copolymer rubber (A) is preferably 30 wt % or less, more preferably 20 wt % or less, particularly preferably 10 wt % or less.

The nitrile group-containing highly saturated copolymer rubber (A) has an iodine value of preferably 120 or less, more preferably 60 or less, furthermore preferably 30 or less, particularly preferably 10 or less. If the nitrile group-containing highly saturated copolymer rubber (A) is too high in iodine value, the obtained cross-linked rubber is liable to fall in heat resistance and ozone resistance.

Further, the nitrile group-containing highly saturated copolymer rubber (A) has a Mooney viscosity [$ML_{1+4}(100°$ C.)] which was measured in accordance with JIS K6300-1 of 50 to 200, preferably 50 to 120, particularly preferably 60 to 110. If the nitrile group-containing highly saturated copolymer rubber (A) has too low a Mooney viscosity, the cross-linked rubber is liable to fall in mechanical properties, while conversely if too high, the rubber composition may fall in workability.

The above nitrile group-containing highly saturated copolymer rubber (A) is not particularly limited in method of production.

In general, the method of copolymerizing an α,β-ethylenically unsaturated nitrile monomer, conjugated diene monomer, and other monomer which is added according to need and which can copolymerize with these is preferable. As the polymerization method, any of the known emulsion polymerization method, suspension polymerization method, bulk polymerization method, and solution polymerization method may be used, but due to the ease of control of the polymerization reaction, the emulsion polymerization method is preferable.

Note that, at the time of emulsion polymerization, an emulsifier, polymerization initiator, molecular weight adjuster, or other usually used polymerization subsidiary material may be used.

Further, when the copolymer (X) which is obtained by copolymerization is higher in iodine value than the above range, the copolymer should be hydrogenated (hydrogenation reaction). The method of hydrogenation is not particularly limited. A known method may be employed.

The emulsifier is not particularly limited, but for example, polyoxyethylene alkyl ether, polyoxyethylene alkyl phenol ether, polyoxyethylene alkyl ester, polyoxyethylene sorbitan alkyl ester, or other nonionic emulsifier; salts of myristic acid, palmitic acid, oleic acid, and linoleic acid or other aliphatic acids, sodium dodecyl benzenesulfonate or other alkyl benzenesulfonic acid salts, higher alcohol sulfuric acid ester salts, alkyl sulfosuccinic acid salts, or other anionic emulsifiers; sulfo esters of α,β-unsaturated carboxylic acids, sulfate esters of α,β-unsaturated carboxylic acids, sulfo alkyl aryl ethers, or other copolymerizable emulsifiers; etc. may be mentioned. The amount of use of the emulsifier is preferably 0.1 to 10 parts by weight with respect to 100 parts by weight of the total monomers.

The polymerization initiator is not particularly limited so long as being a radical initiator, but potassium persulfate, sodium persulfate, ammonium persulfate, potassium perphosphate, hydrogen peroxide, or other inorganic peroxides; t-butyl peroxide, cumen hydroperoxide, p-mentane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, t-butylperoxyisobutyrate, or other organic peroxides; azobis isobutyronitrile, azobis-2,4-dimethyl valeronitrile, azobiscyclohexane carbonitrile, methyl azobis isobutyrate, or other azo compounds; etc. may be mentioned. These polymerization initiators may be used alone or as two or more types combined. As the polymerization initiator, an inorganic or organic peroxide is preferable. When using a polymerization initiator constituted by a peroxide, it may be used together with sodium bisulfite, ferrous sulfate, or other reducing agents in combination as a redox-based polymerization initiator. The amount of use of the polymerization initiator is preferably 0.01 to 2 parts by weight with respect to 100 parts by weight of the total monomer.

The molecular weight adjuster is not particularly limited, but t-dodecyl mercaptan, n-dodecyl mercaptan, octylmercaptan, or other mercaptans; carbon tetrachloride, methylene chloride, methylene bromide, or other halogenated hydrocarbons; α-methylstyrene dimer; tetraethylthiuram disulfide, dipentamethylenethiuram disulfide, diisopropyl xantogen disulfide, or other sulfur compounds etc. may be mentioned. These may be used alone or as two or more types combined. Among these, mercaptans are preferable, while t-dodecyl mercaptan is more preferable. The amount of use of the molecular weight adjuster is preferably 0.1 to 0.8 part by weight with respect to 100 parts by weight of the total monomers.

For the medium for the emulsion polymerization, usually water is used. The amount of the water is preferably 80 to 500 parts by weight with respect to 100 parts by weight of the total monomers.

At the time of emulsion polymerization, it is possible to further use, in accordance with need, a stabilizer, dispersant, pH adjuster, deoxidation agent, particle size adjuster, or other polymerization subsidiary material. If using these, the types and amounts of use are not particularly limited.

Further, by selectively hydrogenating the double bonds of the conjugated diene monomer units of the obtained copolymer (X) and then coagulating and drying the latex etc. which is obtained by hydrogenation, it is possible to produce the nitrile group-containing highly saturated copolymer rubber (A) used in the present invention. Here, the hydrogenation of the copolymer (X) may be performed as is in the latex state after emulsion polymerization, but it is also possible to coagulate and dry the latex state copolymer (X), then dissolve it in acetone or other organic solvent and hydrogenate it. Note that, the type and amount of the hydrogenation catalyst which is used for hydrogenation, hydrogenation temperature, etc. may be determined in accordance with known methods.

Nitrile Group-Containing Highly Saturated Copolymer Rubber (B)

The nitrile group-containing highly saturated copolymer rubber (B) used in the present invention is rubber which has α,β-ethylenically unsaturated nitrile monomer units and a Mooney viscosity [$ML_{1+4}$, 100° C.] of 5 to 45.

The α,β-ethylenically unsaturated nitrile monomer which forms the α,β-ethylenically unsaturated nitrile monomer units is similar to the case of the above nitrile group-containing highly saturated copolymer rubber (A). Acrylonitrile and methacrylonitrile are preferable, while acrylonitrile is particularly preferable.

In the nitrile group-containing highly saturated copolymer rubber (B), the ratio of content of the α,β-ethylenically unsaturated nitrile monomer units is preferably 10 to 60 wt % in the total monomer units, more preferably 20 to 50 wt %. If the content of the α,β-ethylenically unsaturated nitrile monomer units is too small, the obtained cross-linked rubber tends to fall in oil resistance. On the other hand, if too great, the obtained cross-linked rubber tends to fall in cold resistance.

The nitrile group-containing highly saturated copolymer rubber (B) preferably has conjugated diene monomer units in addition to the α,β-ethylenically unsaturated nitrile monomer units from the viewpoint of the obtained cross-linked rubber exhibiting rubber elasticity.

The conjugated diene monomer which forms the conjugated diene monomer units is similar to the case of the above nitrile group-containing highly saturated copolymer rubber (A). 1,3-butadiene and isoprene are more preferable, and 1,3-butadiene is particularly preferable.

In the nitrile group-containing highly saturated copolymer rubber (B), the content of the conjugated diene monomer units is preferably 40 to 90 wt %, particularly preferably 50 to 80 wt %. If the content of the conjugated diene monomer units is too small, the obtained cross-linked rubber is liable to fall in rubber elasticity, while conversely if too great, the heat resistance and chemical stability may be impaired. Further, the above content of conjugated diene monomer units is the content which includes also the hydrogenated parts in the case of performing the hydrogenation which is explained later.

The nitrile group-containing highly saturated copolymer rubber (B), together with further the α,β-ethylenically unsaturated nitrile monomer and conjugated diene monomer, may be copolymerized with other monomers which can be copolymerized with the same. As such other monomers, ones similar to the case of the above nitrile group-containing highly saturated copolymer rubber (A) may be mentioned.

Note that, the content of the other monomer units of the nitrile group-containing highly saturated copolymer rubber (B) is preferably 30 wt % or less, more preferably 20 wt % or less, particularly preferably 10 wt % or less.

The nitrile group-containing highly saturated copolymer rubber (B) has an iodine value of preferably 120 or less, more preferably 60 or less, furthermore preferably 30 or less, particularly preferably 10 or less. If the iodine value of the nitrile group-containing highly saturated copolymer rubber (B) is too high, the obtained cross-linked rubber is liable to fall in heat resistance and ozone resistance.

Further, the Mooney viscosity [$ML_{1+4}(100°\ C.)$] of the nitrile group-containing highly saturated copolymer rubber (B) which was measured in accordance with JIS K 6300-1 is 5 to 45, particularly preferably 10 to 40. If the Mooney viscosity of the nitrile group-containing highly saturated copolymer rubber (B) is too low, a cross-linked rubber which is extremely high in tensile stress and excellent in low heat buildup property cannot be obtained. Further, if the Mooney viscosity of the nitrile group-containing highly saturated copolymer rubber (B) is too high, not only cannot a cross-linked rubber which is extremely high in tensile stress and excellent in low heat buildup property be obtained, but also the nitrile group-containing highly saturated copolymer rubber composition deteriorates in workability.

The ratio of use of the nitrile group-containing highly saturated copolymer rubber (B) is preferably 5 to 75 wt % with respect to 100 wt % of the total of the nitrile group-containing highly saturated copolymer rubber (A) and the nitrile group-containing highly saturated copolymer rubber (B), particularly preferably 15 to 75 wt %, since the effect of the present invention becomes much more remarkable.

The method of production of the nitrile group-containing highly saturated copolymer rubber (B) is not particularly limited, but (i) the method of imparting a high shearing force to the above obtained nitrile group-containing highly saturated copolymer rubber (A) to cut the polymer chain and thereby lower the molecular weight (lower the Mooney viscosity), (ii) the method of coagulating and drying the above obtained copolymer (X), then using an olefin metathesis reaction by a conventionally known method to lower the molecular weight (lower the Mooney viscosity), then selectively hydrogenating the double bonds of the conjugated diene monomer units, (iii) the method of usihng a relative large amount of a chain transfer agent when producing (polymerizing) the copolymer (X) so as to lower the molecular weight (lower the Mooney viscosity), then selectively hydrogenating the double bonds of the conjugated diene monomer units, etc. may be mentioned, but since no complicated reaction steps are required, the method of the above (i) is preferable.

As a preferable specific example of the method of the above (i), the method may be mentioned of adding poly(2,2,4-trimethyl-1,2-dihydroquinoline) or another conventionally known antiaging agent to the nitrile group-containing highly saturated copolymer rubber (A) and using a twin-screw extruder to knead them so as to impart a high shearing force and cut the polymer chain to thereby lower the molecular weight (lower the Mooney viscosity) so as to obtain the nitrile group-containing highly saturated copolymer rubber (B).

In this case, the screw speed of the twin-screw extruder is preferably 200 to 400 rpm.

Further, the temperature at the time of giving a high shearing force is preferably 200 to 350° C.

Furthermore, the time of giving a high shearing force (in case of continuous system, the "residence time") is preferably 5 seconds to 5 minutes.

In the method of the above (i), the amount of addition of the antiaging agent is preferably 0.1 to 5 parts by weight with respect to 100 parts by weight of the nitrile group-containing highly saturated copolymer rubber (A), particularly preferably 0.5 to 3 parts by weight.

Staple Fibers (C)

The staple fibers (C) used in the present invention have an average fiber length of 0.1 to 12 mm. Here, the average fiber length is the value which is obtained when photographing the fibers using an optical microscope, measuring the lengths of 100 of the staple fibers which are randomly selected in the obtained photograph, and finding the arithmetic average.

If the staple fibers (C) are too large in average fiber length, the staple fibers will easily become entangled and form masses and will tend to be hard to disperse into the rubber composition, while conversely if they are too small, the desired tensile stress will be hard to obtain.

Note that, average fiber length of the staple fibers (C) is preferably 0.5 to 10 mm, particularly preferably 1 to 8 mm.

Further, the average fiber diameter of the staple fibers (C) is preferably 0.5 to 100 μm, more preferably 1 to 50 μm, particularly preferably 2 to 20 μm, since the effect of the present invention becomes much more remarkable. Note that, the average fiber diameter is the value which is obtained when photographing the fibers using an optical microscope, measuring the diameters of the thickest parts of 100 of the staple fibers which are randomly selected in the obtained photograph, and finding the arithmetic average.

Note that, the aspect ratio of the staple fibers (C) ([average fiber length of staple fibers]/[average fiber diameter of staple fibers]) is preferably 5 to 1000, particularly preferably 50 to 800.

When the aspect ratio of the staple fibers (C) is in the above range, the effect of the present invention becomes much more remarkable.

As the staple fibers (C), organic fibers and inorganic fibers may be mentioned. As the organic fibers, fibers which are comprised of cotton, wood cellulose fibers, or other natural fibers; polyamide, polyester, polyvinyl alcohol, rayon, polyparaphenylene benzobisoxazole, polyethylene, polypropylene, polyacrylate, polyimide, polyphenylene sulfide, polyether ether ketone, polylactic acid, polycaprolactone, polybutylene succinate, a fluorine-based polymer, or other fibers which are comprised of synthetic resin; etc. may be mentioned. As inorganic fibers, glass fiber, carbon fiber, etc. may be mentioned.

Among these as well, since the effect of the present invention becomes much more remarkable, use of organic fibers is preferable, use of fibers which are comprised of a synthetic resin is more preferable, and use of fibers which are comprised of a polyamide is furthermore preferable.

As the polyamide, polycapramide, poly-ω-aminoheptanoic acid, poly-ω-aminononaoic acid, polyundecaneamide, polyethylenediamine adipamide, polytetramethylene adipamide, polyhexamethylene adipamide, polyhexamethylene sebacamide, polyhexamethylene dodecamide, polyoctamethylene adipamide, polydecamethylene adipamide, and other aliphatic polyamides; polyparaphenylene terephthalamide (product name "Kevlar", made by Toray Dupont), polymetaphenylene isophthalamide (product name "Conex", made by Teijin Technoproducts), copolyparaphenylene 3,4'oxydiphenylene terephthalamide (product name "Technora", made by Teijin Technoproducts), polymetaxylylene adipamide, polymetaxylylene pimeramide, polymetaxylylene azelamide, polyparaxylylene azelamide, polyparaxylylene decanamide, and other aromatic polyamide (aramides); etc. may be mentioned, but due to the ease of obtaining cross-linked rubber which is extremely high in tensile stress and excellent in low heat buildup property, an aromatic polyamide (aramide) is preferable, polyparaphenylene terephthalamide, polymetaphenylene isophthalamide, and copolyparaphenylene 3,4'oxydiphenylene terephthalamide are more preferable, and copolyparaphenylene 3,4'oxydiphenylene terephthalamide is particularly preferable.

The staple fibers (C) may be used as single type alone or as two or more types combined.

The ratio of content of the staple fibers (C) is preferably 0.1 to 50 parts by weight with respect to 100 parts by weight of the total of the nitrile group-containing highly saturated copolymer rubber (A) and the nitrile group-containing highly saturated copolymer rubber (B), more preferably 0.5 to 20 parts by weight, particularly preferably 1 to 10 parts by weight, since cross-linked rubber which is extremely high in tensile stress and excellent in low heat buildup property is easily obtained.

Note that, the staple fibers (C) may be surface treated by a binder composition which is comprised of an epoxy-based resin and latex, a binder composition which is comprised of an isocyanate-based resin and latex, a binder composition which is comprised of a resorcinol formaldehyde resin and latex (RFL), etc.

α,β-ethylenically Unsaturated Carboxylic Acid Metal Salt (D)

The nitrile group-containing highly saturated copolymer rubber composition of the present invention preferably further contains α,β-ethylenically unsaturated carboxylic acid metal salt (D) from the viewpoint of improving the obtained cross-linked rubber in tensile strength and low heat buildup property. The ratio of content of the α,β-ethylenically unsaturated carboxylic acid metal salt (D) is preferably 3 to 120 parts by weight with respect to 100 parts by weight of the total of the nitrile group-containing highly saturated copolymer rubber (A) and the nitrile group-containing highly saturated copolymer rubber (B), more preferably 5 to 100 parts by weight, particularly preferably 5 to 50 parts by weight. If the content of the α,β-ethylenically unsaturated carboxylic acid metal salt (D) is too small, the effect of improvement of the tensile strength sometimes cannot be obtained, while conversely if too great, the elongation may become smaller.

The α,β-ethylenically unsaturated carboxylic acid which forms the α,β-ethylenically unsaturated carboxylic acid metal salt (D) is one which has at least monovalent free carboxyl groups for forming a metal salt such as an unsaturated monocarboxylic acid, unsaturated dicarboxylic acid, unsaturated dicarboxylic acid monoester, etc. As the unsaturated monocarboxylic acid, acrylic acid, methacrylic acid, etc. may be mentioned. As the unsaturated dicarboxylic acid, maleic acid, fumaric acid, itaconic acid, etc. may be mentioned. As the unsaturated dicarboxylic acid monoester, monomethyl maleate, monoethyl maleate, monomethyl itaconate, monoethyl itaconate, etc. may be mentioned. Among these ethylenically unsaturated carboxylic acids, an ethylenically unsaturated carboxylic acid which does not have ester groups is preferable, an unsaturated monocarboxylic acid is more preferable, and methacrylic acid is particularly preferable.

The metal of the α,β-ethylenically unsaturated carboxylic acid metal salt (D) is not particularly limited so long as foaming a salt with the above α,β-ethylenically unsaturated carboxylic acid, but zinc, magnesium, calcium, barium, titanium, chromium, iron, cobalt, nickel, aluminum, tin, and lead are preferable, zinc, magnesium, calcium, and aluminum are more preferable, and zinc and magnesium are particularly preferable.

The α,β-ethylenically unsaturated carboxylic acid metal salt (D) is obtained by reacting an α,β-ethylenically unsaturated carboxylic acid and an oxide, hydroxide, carbonate, etc. of the metal to form a salt.

When forming the above salt, the amount of metal with respect to 1 mole of the free carboxyl groups in the α,β-ethylenically unsaturated carboxylic acid is preferably 0.2 to 3 moles, more preferably 0.3 to 2.5 moles, particularly preferably 0.4 to 2 moles. If the α,β-ethylenically unsaturated carboxylic acid is too great (the amount of metal is too small), the smell of the residual monomer in the rubber composition becomes strong, while if the α,β-ethylenically unsaturated carboxylic acid is too small (the amount of metal is too great), the cross-linked rubber sometimes falls in strength.

Note that, when kneading it with the nitrile group-containing highly saturated copolymer rubber (A), nitrile group-containing highly saturated copolymer rubber (B) and other ingredients to prepare the rubber composition, the α,β-ethylenically unsaturated carboxylic acid metal salt (D) may be mixed into the rubber in the form of the above metal salt, but it is also possible to not form the metal salt in advance, but to mix in the α,β-ethylenically unsaturated carboxylic acid and the oxide, hydroxide, carbonate, etc. of the metal which will fort the metal salt and cause these to react to form the salt in the process of the mixing operation.

Cross-Linkable Nitrile Rubber Composition

The cross-linkable nitrile rubber composition of the present invention comprises the nitrile group-containing highly saturated copolymer rubber (A), nitrile group-containing highly saturated copolymer rubber (B), staple fibers (C), and, in accordance with need, α,β-ethylenically unsaturated carboxylic acid metal salt (D) into which a cross-linking agent is mixed. The cross-linking agent used in the present invention is not particularly limited so long as able to cross-link the nitrile group-containing highly saturated copolymer rubber of the present invention, but an organic peroxide cross-linking agent, sulfur cross-linking agent, polyamine cross-linking agent, etc. may be mentioned, while an organic peroxide cross-linking agent is preferable.

As the organic peroxide cross-linking agent, dialkyl peroxides, diacyl peroxides, peroxy esters, etc. may be mentioned, preferably dialkyl peroxides. As the dialkyl peroxides, for example, dicumyl peroxide, di-t-butyl peroxide, 2,5-dimethyl-2,5-di(t-butylperoxy)-3-hexine, 2,5-dimethyl-2,5-di(t-butylperoxy)hexane, 1,3-bis(t-butylperoxyisopropyl)benzene, etc. may be mentioned. As diacyl peroxides, for example, benzoyl peroxide, isobutyryl peroxide, etc. may be mentioned. As peroxyesters, for example, 2,5-dimethyl-2,5-bis(benzoyl peroxy)hexane, t-butylperoxyisopropyl carbonate, etc. may be mentioned.

As the sulfur cross-linking agent, powdered sulfur, precipitated sulfur, and other sulfurs; 4,4'-dithiomorpholin and tetramethylthiuram disulfide, tetraethylthiuram disulfide, polymer polysulfides, and other organic sulfur compounds; etc. may be mentioned.

As the polyamine cross-linking agent, hexamethylenediamine, hexamethylenediamine carbamate, 2,2-bis{4-(4-aminophenoxy)phenyl}propane, 4,4'-methylene dianiline, m-phenylene diamine, dihydrazide adipate, etc. may be mentioned. Note that, a polyamine cross-linking agent is usually used when using as the nitrile group-containing highly saturated copolymer rubber (A) or nitrile group-containing highly saturated copolymer rubber (B) one obtained by copolymerizing a monomer which contains carboxyl groups.

In the cross-linkable nitrile rubber composition of the present invention, the content of the cross-linking agent is preferably 0.1 to 20 parts by weight with respect to 100 parts by weight of the total of the nitrile group-containing highly saturated copolymer rubber (A) and nitrile group-containing highly saturated copolymer rubber (B), particularly preferably 1 to 10 parts by weight. If the content of the cross-linking agent is too small, the obtained cross-linked rubber is liable to deteriorate in tensile stress. On the other hand, if too great, the obtained cross-linked rubber may deteriorate in fatigue resistance.

Further, the cross-linkable nitrile rubber composition of the present invention may have blended into it, other than the nitrile group-containing highly saturated copolymer rubber (A), nitrile group-containing highly saturated copolymer rubber (B), staple fibers (C), α,β-ethylenically unsaturated carboxylic acid metal salt (D), and cross-linking agent, compounding agents which are usually used in the rubber field, for example, carbon black, silica and other reinforcing fillers, calcium carbonate, clay and other nonreinforcing fillers, a cross-linking accelerator, cross-linking aid, cross-linking retardant, antiaging agent, antioxidant, photostabilizer, primary amine and other scorch preventer, plasticizer, processing aid, slip agent, tackifier, lubricant, flame retardant, antifungal agent, acid acceptor, antistatic agent, pigment, etc. The amounts of these compounding agents are not particularly limited so long as ranges not impairing the object and effect of the present invention. Amounts in accordance with the purpose may be added.

The cross-linkable nitrile rubber composition of the present invention may have blended into it, in a range in which the effect of the present invention is not impaired, a rubber other than the nitrile group-containing highly saturated copolymer rubber (A) and nitrile group-containing highly saturated copolymer rubber (B).

As such rubber, acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorine rubber, natural rubber, polyisoprene rubber, etc. may be mentioned.

When blending in a rubber other than the nitrile group-containing highly saturated copolymer rubber (A) and the nitrile group-containing highly saturated copolymer rubber (B), the amount of the other rubber in the cross-linkable nitrile rubber composition is preferably 30 parts by weight or less with respect to 100 parts by weight of the total of the nitrile group-containing highly saturated copolymer rubber (A) and nitrile group-containing highly saturated copolymer rubber (B), more preferably 20 parts by weight or less, furthermore preferably 10 parts by weight or less.

The cross-linkable nitrile rubber composition of the present invention is prepared by mixing the above ingredients preferably in a nonaqueous system. The method of preparing the cross-linkable nitrile rubber composition of the present invention is not particularly limited, but usually it can be prepared by kneading the ingredients other than the cross-linking agent and thermally unstable cross-linking aids etc. by primary kneading using a Banbury mixer, internal mixer, kneader, or other mixer, then transferring the mixture to a roll etc. and adding the cross-linking agent and thermally unstable cross-linking aid etc. and kneading them by secondary kneading.

The thus obtained cross-linkable nitrile rubber composition of the present invention has a compound Mooney viscosity [$ML_{1+4}$, 100° C.] of preferably 15 to 200, more preferably 20 to 150, particularly preferably 50 to 100, and is excellent in workability.

Cross-Linked Rubber

The cross-linked rubber of the present invention is obtained by cross-linking the above-mentioned cross-linkable nitrile rubber composition of the present invention.

The cross-linked rubber of the present invention may be produced by using the cross-linkable nitrile rubber composition of the present invention, shaping it by for example a molding machine corresponding to the desired shape such as an extruder, injection molding machine, compressor, roll, etc., heating it to perform a cross-linking reaction, and fixing the shape as a cross-linked product. In this case, it is possible to perform the cross-linking after the preliminary shaping or perform the cross-linking simultaneously with the shaping. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 6 hours.

Further, depending on the shape, size, etc. of the cross-linked rubber, sometimes the inside will not be sufficiently cross-linked even if the surface is cross-linked, so it may be further heated for secondary cross-linking.

As the heating method, press heating, steam heating, oven heating, hot air heating, and other general methods which are used for cross-linking rubber may be suitably selected.

The thus obtained cross-linked rubber of the present invention is extremely high in tensile stress and excellent in low heat buildup property.

For this reason, the cross-linked rubber of the present invention can be used for O-rings, packings, diaphragms, oil seals, shaft seals, bearing seals, well head seals, air compressor seals, seals for sealing in Freon or fluorohydrocarbons or carbon dioxide which is used for compressors for cooling devices for air conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), bladders, and other various seal members; intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, top cover use gaskets for hard disk drives, and other various types of gaskets;

printing use rolls, ironmaking use rolls, papermaking use rolls, industrial use rolls, office equipment use rolls, and other various types of rolls; flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts etc.), CVT use belts, timing belts, toothed belt, conveyor belts, and other various types of belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flow lines, and other various types of hoses; CVJ boots, propeller shaft boots, constant velocity joint boots, rack and pinion boots, and other various types of boots; cushion materials, dynamic dampers, rubber couplings, air springs, shock absorbers, and other attenuating member rubber parts; dust covers, automotive interior members, tires, covered cables, shoe soles, electromagnetic wave shields, binders for flexible printed circuits boards or other binders, fuel cell separators and also other broad applications in the fields of cosmetics, pharmaceuticals, and the electronics field, etc. Among these as well, the cross-linked rubber of the present invention can be suitably used for belts.

EXAMPLES

Below, the present invention will be further explained based on detailed examples, but the present invention is not limited to these examples. Note that, below, "parts" are based on weight unless otherwise indicated. Further, the tests and evaluations were performed as follows.

Iodine Value

The iodine value of the nitrile group-containing highly saturated copolymer rubber was measured based on JIS K 6235.

Composition of Nitrile Group-Containing Highly Saturated Copolymer Rubber

The ratios of contents of the monomer units which form the nitrile group-containing highly saturated copolymer rubber were measured by the following method.

That is, the ratio of content of the 1,3-butadiene units (including hydrogenated part) was calculated by using the nitrile rubber before hydrogenation to measure the iodine value (according to JIS K 6235).

The ratio of content of the acrylonitrile units was calculated in accordance with JIS K 6383 by measuring the nitrogen content in the nitrile group-containing highly saturated copolymer rubber by the Kjeldahl method.

Mooney Viscosity (Polymer Mooney and Compound Mooney)

The Mooney viscosity of the nitrile group-containing highly saturated copolymer rubber (polymer Mooney) and the Mooney viscosity of the cross-linkable nitrile rubber composition (compound Mooney) were measured in accordance with JIS K 6300-1 (unit: [$ML_{1+4}$, 100° C.]).

Banbury Workability (Sticking at Dump Out)

The workability of the nitrile group-containing highly saturated copolymer rubber composition when kneaded by a Banbury mixer was evaluated by the following method.

A Banbury mixer was used to knead the nitrile group-containing highly saturated copolymer rubber composition before mixing in the cross-linking agent. At the time of dump out (discharge) of the nitrile group-containing highly saturated copolymer rubber composition after kneading, the sticking state was visually observed. The Banbury workability was evaluated by the following criteria.

G (good): rubber composition does not stick to discharge port of Banbury mixer.

F (fair): rubber composition sticks somewhat at discharge port of Banbury mixer.

P (poor): rubber composition remarkably sticks at discharge port of Banbury mixer.

Normal Physical Properties (Tensile Strength, Tensile Stress, Elongation, and Hardness)

The cross-linkable nitrile rubber composition was placed in a vertical 15 cm, horizontal 15 cm, depth 0.2 cm mold and press formed while applying a press pressure of 10 MPa at 170° C. for 20 minutes to obtain sheet-shaped cross-linked rubber. The obtained sheet-shaped cross-linked rubber was punched out to a No. 3 dumbbell shape to prepare a test piece. Further, the obtained test piece was used in accordance with JIS K 6251 to measure the cross-linked rubber for tensile strength at break, 10% tensile stress, 20% tensile stress, 100% tensile stress, and elongation at break and, further, in accordance with JIS K 6253 to measure the hardness of the cross-linked rubber using a Durometer Hardness Tester (Type A).

Heat Buildup Property (Dynamic Viscoelasticity Test)

The same procedure was followed as with evaluation of the above normal physical properties to obtain the sheet-shaped cross-linked rubber, then the obtained sheet-shaped cross-linked rubber was punched to a width of 10 mm and length of 50 mm to obtain cross-linked rubber for a dynamic viscoelasticity test. Further, the obtained cross-linked rubber for the dynamic viscoelasticity test was measured for tan δ by using a dynamic viscoelasticity measurement apparatus (product name "Explexor 500N", made by GABO QUALIMETER Testanlagen GmbH) under conditions of a measurement frequency: 50 Hz, static strain: 1.0%, dynamic strain: 0.2%, temperature: 100° C., chuck distance: 30 mm, measurement mode: tension mode.

Further, the value of the obtained tan δ was indicated indexed to the measurement value of Comparative Example 1 as 100. The smaller this value, the smaller the dynamic heat generation and the better the low heat buildup property.

Production Example 1 (Production of Nitrile Group-Containing Highly Saturated Copolymer Rubber (a1))

In a reactor, ion exchanged water 200 parts and fatty acid potassium soap (potassium salt of fatty acid) 2.25 parts were added to prepare a soap aqueous solution. Further, to this soap aqueous solution, acrylonitrile 42 parts and t-dodecyl mercaptan (molecular weight adjuster) 0.45 part were charged in that order. The gas at the inside was replaced with nitrogen 3 times, then 1,3-butadiene 58 parts was charged. Next, while holding the inside of the reactor at 5° C., cumen hydroperoxide (polymerization initiator) 0.1 part was charged and a polymerization reaction was performed while stirring for 16 hours. Next, a concentration 10% hydroquinone (polymerization terminator) aqueous solution 0.1 part was added to stop the polymerization reaction and a water temperature 60° C. rotary evaporator was used to remove the residual monomer to obtain a latex of nitrile rubber (solid content concentration about 25 wt %).

Next, the above obtained latex was added to an aqueous solution of an amount of aluminum sulfate of 3 wt % with respect to the nitrile rubber ingredient and stirred to coagulate the latex. This was washed by water while separating it by filtration, then dried in vacuo at 60° C. for 12 hours to obtain nitrile rubber. Further, the obtained nitrile rubber was dissolved in acetone to a concentration of 12%. This was placed in an autoclave, 500 wt ppm of a palladium silica catalyst was added to the nitrile rubber, then this was reacted at a hydrogen pressure of 3 MPa and a temperature of 50° C. for hydrogenation. After the hydrogenation reaction finished, the rubber was poured into a large amount of water to make it coagulate, then was separated by filtration and dried to obtain the nitrile group-containing highly saturated copolymer rubber (a1). The obtained nitrile group-containing highly saturated copolymer rubber (a1) had a composition of acrylonitrile units of 40.5 wt % and 1,3-butadiene units (incliuding hydrogenated part) of 59.5 wt %, the iodine value was 7, and the polymer Mooney viscosity [$ML_{1+4}$, 100° C.] was 100.

Production Example 2 (Production of Nitrile Group-Containing Highly Saturated Copolymer Rubber (a2))

Except for, in Production Example 1, changing the t-dodecyl mercaptan (molecular weight adjuster) 0.45 part to 0.55 part, the same procedure was followed as in Production Example 1 to obtain a nitrile group-containing highly saturated copolymer rubber (a2). The obtained nitrile group-containing highly saturated copolymer rubber (a2) had a composition of acrylonitrile units of 40.5 wt % and 1,3-butadiene units (including hydrogenated parts) of 59.5 wt %, the iodine value was 7, and the polymer Mooney viscosity [$ML_{1+4}$, 100° C.] was 75.

Production Example 3 (Production of Nitrile Group-Containing Highly Saturated Copolymer Rubber (a3))

Except for, in Production Example 1, changing the acrylonitrile 42 parts to 37 parts, the t-dodecyl mercaptan (molecular weight adjuster) 0.45 part to 0.5 part, and the 1,3-butadiene 58 parts to 63 parts, the same procedure was followed as in Production Example 1 to obtain a nitrile group-containing highly saturated copolymer rubber (a3). The obtained nitrile group-containing highly saturated copolymer rubber (a3) had a composition of acrylonitrile units of 36.2 wt % and 1,3-butadiene units (incliuding hydrogenated parts) of 63.8 wt %, the iodine value was 7, and the polymer Mooney viscosity [$ML_{1+4}$, 100° C.] was 85.

Production Example 4 (Production of Nitrile Group-Containing Highly Saturated Copolymer Rubber (a4))

Except for, in Production Example 3, changing the t-dodecyl mercaptan (molecular weight adjuster) 0.5 part to 0.55 part, the same procedure was followed as in Production Example 3 to obtain a nitrile group-containing highly saturated copolymer rubber (a4). The obtained nitrile group-containing highly saturated copolymer rubber (a4) had a composition of acrylonitrile units of 36.2 wt % and 1,3-butadiene units (including hydrogenated parts) of 63.8 wt %, the iodine value was 7, and the polymer Mooney viscosity [$ML_{1+4}$, 100° C.] was 72.

Production Example 5 (Production of Nitrile Group-Containing Highly Saturated Copolymer Rubber (b1))

A twin-screw extruder (one comprised of seven barrels connected) was used to add poly(2,2,4-trimethyl-1,2-dihydroquinoline) (product name "Nocrac 224", made by Ouchi Shinko Chemical Industrial, amine ketone antiaging agent) 1 part to 100 parts of the nitrile group-containing highly saturated copolymer rubber (a1) which was obtained in Production Example 1 and the mixture was treated to impart a high shearing force under the following conditions to obtain a nitrile group-containing highly saturated copolymer rubber (b1).

Screw speed: 300 rpm
Set temperature: barrel 1 (charging zone) of 100° C.
Set temperature: barrel 2 (melting zone) of 250° C.
Barrels 3 to 6 (kneading and shear zone) of 250 to 290° C.
Barrel 7 (kneading and deaeration zone) 200 to 250° C.

The obtained nitrile group-containing highly saturated copolymer rubber (b1) had a composition of acrylonitrile units 40.5 wt % and 1,3-butadiene units (incliuding hydrogenated part) 59.5 wt %, the iodine value was 7, and the polymer Mooney viscosity [$ML_{1+4}$, 100° C.] was 25.

Production Example 6 (Production of Nitrile Group-Containing Highly Saturated Copolymer Rubber (b2))

Except for using, instead of the nitrile group-containing highly saturated copolymer rubber (a1), the nitrile group-containing highly saturated copolymer rubber (a3) which was obtained in Production Example 3, the same procedure was followed as in Production Example 5 to obtain a nitrile group-containing highly saturated copolymer rubber (b2). The obtained nitrile group-containing highly saturated copolymer rubber (b2) had a composition of acrylonitrile units of 36.2 wt % and 1,3-butadiene units (including hydrogenated part) of 63.8 wt %, the iodine value was 7, and the polymer Mooney viscosity [$ML_{1+4}$, 100° C.] was 25.

Example 1

A Banbury mixer was used to knead the nitrile group-containing highly saturated copolymer rubber (a1) which was obtained in Production Example 1, 50 parts, the nitrile group-containing highly saturated copolymer rubber (b1) which was obtained in Production Example 5, 50 parts, N774 Carbon Black (product name "Seast S", made by Tokai Carbon) 50 parts, 4,4'-di-(α,α-dimethylbenzyl)diphenylamine (product name "Nocrac CD", made by Ouchi Shinko Chemical Industrial, antiaging agent) 1.5 parts, tri-2-ethylhexyl trimellitate (product name "ADK Cizer C-8", made by ADEKA, Plasticizer) 5 parts, and copolyparaphenylene 3,4'oxydiphenylene terephthalamide staple fibers (product name "Technora DCF 3 mm", made by Teijin Technoproducts, staple fibers of average fiber length 3 mm, average fiber diameter 12 μm, and aspect ratio 250) 3 parts. Next, the mixture was transferred to a roll and kneaded with the addition of 1,3-bis(t-butylperoxyisopropyl)benzene 40% product (product name "Vul Cup 40KE", made by GEO Specialty Chemicals Inc., organic peroxide cross-linking agent) 8 parts to obtain a cross-linkable nitrile rubber composition.

Further, the above-mentioned methods were used to evaluate and test the Banbury workability, compound Mooney viscosity, normal physical properties, and heat buildup property. Note that, the Banbury workability was evaluated by kneading a nitrile group-containing highly saturated copolymer rubber composition before mixing in a cross-linking agent constituted by 1,3-bis(t-butylperoxyisopropyl)benzene 40% product by a Banbury mixer, then dumping out (discharging) the kneaded nitrile group-containing highly saturated copolymer rubber composition during which examining the state of sticking by the eye. The results are shown in Table 1.

Example 2

Except for changing the nitrile group-containing highly saturated copolymer rubber (a1) 50 parts to 65 parts and the nitrile group-containing highly saturated copolymer rubber (b1) 50 parts to 35 parts, the same procedure was followed as in Example 1 to obtain the cross-linkable nitrile rubber composition and similarly evaluate it. The results are shown in Table 1.

Example 3

Except for changing the nitrile group-containing highly saturated copolymer rubber (a1) 50 parts to 75 parts and the nitrile group-containing highly saturated copolymer rubber (b1) 50 parts to 25 parts, the same procedure was followed as in Example 1 to obtain the cross-linkable nitrile rubber composition and similarly evaluate it. The results are shown in Table 1.

Example 4

Except for changing the nitrile group-containing highly saturated copolymer rubber (a1) 50 parts to 30 parts and the nitrile group-containing highly saturated copolymer rubber (b1) 50 parts to 70 parts, the same procedure was followed as in Example 1 to obtain the cross-linkable nitrile rubber composition and similarly evaluate it. The results are shown in Table 1.

Example 5

Except for changing the nitrile group-containing highly saturated copolymer rubber (a1) 50 parts to the nitrile group-containing highly saturated copolymer rubber (a3) which was obtained in Production Example 3, 50 parts and the nitrile group-containing highly saturated copolymer rubber (b1) 50 parts to the nitrile group-containing highly saturated copolymer rubber (b2) which was obtained in Production Example 6, 50 parts, the same procedure was followed as in Example 1 to obtain the cross-linkable nitrile rubber composition and similarly evaluate it. The results are shown in Table 1.

Example 6

Except for changing the copolyparaphenylene 3,4'oxydiphenylene terephthalamide staple fibers (product name "Technora DCF 3 mm", made by Teijin Technoproducts, staple fibers of average fiber length 3 mm, average fiber diameter 12 μm, and aspect ratio 250) 3 parts to copolyparaphenylene 3,4'oxydiphenylene terephthalamide staple fibers (product name "Technora DCF 6 mm", made by Teijin Technoproducts, staple fibers of average fiber length 6 mm, average fiber diameter 12 μm, and aspect ratio 500), the same procedure was followed as in Example 1 to obtain a cross-linkable nitrile rubber composition and similarly evaluate it. The results are shown in Table 1.

Example 7

Except for changing the N774 Carbon Black 50 parts to 20 parts and adding zinc methacrylate 15 parts, the same procedure was followed as in Example 1 to obtain a cross-linkable nitrile rubber composition and similarly evaluate it. The results are shown in Table 1.

Example 8

Except for changing the N774 Carbon Black 50 parts to 20 parts and adding zinc methacrylate 15 parts, the same procedure was followed as in Example 5 to obtain a cross-linkable nitrile rubber composition and similarly evaluate it. The results are shown in Table 1.

Comparative Example 1

Except for changing the nitrile group-containing highly saturated copolymer rubber (a1) 50 parts to 100 parts and not mixing the nitrile group-containing highly saturated copolymer rubber (b1), the same procedure was followed as in Example 1 to obtain a cross-linkable nitrile rubber composition and similarly evaluate it. The results are shown in Table 1.

Comparative Example 2

Except for changing the nitrile group-containing highly saturated copolymer rubber (a1) 100 parts to the nitrile group-containing highly saturated copolymer rubber (a2) which was obtained in Production Example 2, 100 parts, the same procedure was followed as in Comparative Example 1 to obtain a cross-linkable nitrile rubber composition and similarly evaluate it. The results are shown in Table 1.

Comparative Example 3

Except for changing the nitrile group-containing highly saturated copolymer rubber (a1) 100 parts to the nitrile group-containing highly saturated copolymer rubber (a3) which was obtained in Production Example 3, 100 parts, the same procedure was followed as in Comparative Example 1 to obtain a cross-linkable nitrile rubber composition and similarly evaluate it. The results are shown in Table 2.

Comparative Example 4

Except for changing the nitrile group-containing highly saturated copolymer rubber (a1) 100 parts to the nitrile group-containing highly saturated copolymer rubber (a4) which was obtained in Production Example 4, 100 parts, the same procedure was followed as in Comparative Example 1 to obtain a cross-linkable nitrile rubber composition and similarly evaluate it. The results are shown in Table 2.

Comparative Example 5

Except for changing the nitrile group-containing highly saturated copolymer rubber (a1) 100 parts to the nitrile group-containing highly saturated copolymer rubber (b1) which was obtained in Production Example 5, 100 parts, the same procedure was followed as in Comparative Example 1 to obtain a cross-linkable nitrile rubber composition and similarly evaluate it. The results are shown in Table 2.

Comparative Example 6

Except for changing the nitrile group-containing highly saturated copolymer rubber (a1) 100 parts to the nitrile group-containing highly saturated copolymer rubber (b2) which was obtained in Production Example 6, 100 parts, the same procedure was followed as in Comparative Example 1 to obtain a cross-linkable nitrile rubber composition and similarly evaluate it. The results are shown in Table 2.

Comparative Example 7

Except for not mixing copolyparaphenylene 3,4'oxydiphenylene terephthalamide staple fibers (product name "Technora DCF 3 mm", made by Teijin Technoproducts, staple fibers of average fiber length 3 mm, average fiber diameter 12 μm, and aspect ratio 250), the same procedure was followed as in Example 1 to obtain a cross-linkable nitrile rubber composition and similarly evaluate it. The results are shown in Table 2.

TABLE 1

| | | Examples | | | | | | | | Comp. ex | |
|---|---|---|---|---|---|---|---|---|---|---|---|
| | | 1 | 2 | 3 | 4 | 5 | 6 | 7 | 8 | 1 | 2 |
| Formulation | | | | | | | | | | | |
| Nitrile-group-containing highly saturated copolymer rubber (a1) | (part) | 50 | 65 | 75 | 30 | — | 50 | 50 | — | 100 | — |
| Nitrile-group-containing highly saturated copolymer rubber (a2) | (part) | — | — | — | — | — | — | — | — | — | 100 |
| Nitrile-group-containing highly saturated copolymer rubber (a3) | (Part) | — | — | — | — | 50 | — | — | 50 | — | — |
| Nitrile-group-containing highly saturated copolymer rubber (a4) | (part) | — | — | — | — | — | — | — | — | — | — |
| Nitrile-group-containing highly saturated copolymer rubber (b1) | (part) | 50 | 35 | 25 | 70 | — | 50 | 50 | — | — | — |
| Nitrile-group-containing highly saturated copolymer rubber (b2) | (part) | — | — | — | — | 50 | — | — | 50 | — | — |
| N774 Carbon Black | (part) | 50 | 50 | 50 | 50 | 50 | 50 | 20 | 20 | 50 | 50 |
| Zinc methacrylate | (part) | — | — | — | — | — | — | 15 | 15 | — | — |
| ADK Cizer C-8 (plasticizer) | (part) | 5 | 5 | 5 | 5 | 5 | 5 | 5 | 5 | 5 | 5 |
| Nocrac CD (antiaging agent) | (part) | 1.5 | 1.5 | 1.5 | 1.5 | 1.5 | 1.5 | 1.5 | 1.5 | 1.5 | 1.5 |
| Technora DCF 3 mm (staple fibers) | (part) | 3 | 3 | 3 | 3 | 3 | — | 3 | 3 | 3 | 3 |
| Technora DCF 6 mm (staple fibers) | (part) | — | — | — | — | — | 3 | — | — | — | — |
| Vul Cup 40KE (cross-linking agent) | (part) | 8 | 8 | 8 | 8 | 8 | 8 | 8 | 8 | 8 | 8 |
| Workability | | | | | | | | | | | |
| Compound Mooney (ML$_{1+4}$. 100° C.) | | 72 | 84 | 93 | 62 | 65 | 76 | 58 | 53 | 116 | 87 |
| Sticking at dump out | | G | G | G | G | G | G | G | G | G | F |
| Normal physical properties | | | | | | | | | | | |
| Tensile strength | (MPa) | 22.8 | 23.9 | 24.0 | 21.9 | 22.6 | 22.2 | 27.8 | 26.9 | 24.3 | 22.7 |
| Elongation | (%) | 350 | 370 | 370 | 340 | 350 | 330 | 380 | 370 | 360 | 340 |
| 10% tensile stress | (MPa) | 8.9 | 8.5 | 7.0 | 7.5 | 8.4 | 9.2 | 9.8 | 9.2 | 2.9 | 2.0 |
| 20% tensile stress | (MPa) | 10.1 | 9.8 | 8.8 | 8.6 | 9.2 | 11.8 | 11.7 | 11.1 | 5.8 | 4.6 |
| 100% tensile stress | (MPa) | 9.1 | 9.1 | 9.1 | 8.7 | 9.0 | 9.2 | 9.4 | 9.1 | 9.2 | 9.3 |
| Hardness (DURO A) | | 78 | 78 | 78 | 77 | 77 | 78 | 77 | 77 | 77 | 76 |
| Heat buildup property (relative index to Comparative Example 1 as 100) | | | | | | | | | | | |
| tan δ (relative index) | | 105 | 104 | 106 | 107 | 107 | 104 | 95 | 97 | 100 | 112 |

TABLE 2

|  |  | Comp. ex | | | | |
| --- | --- | --- | --- | --- | --- | --- |
|  |  | 3 | 4 | 5 | 6 | 7 |
| Formulation | | | | | | |
| Nitrile-group-containing highly saturated copolymer rubber (a1) | (part) | — | — | — | — | 50 |
| Nitrile-group-containing highly saturated copolymer rubber (a2) | (part) | — | — | — | — | — |
| Nitrile-group-containing highly saturated copolymer rubber (a3) | (part) | 100 | — | — | — | — |
| Nitrile-group-containing highly saturated copolymer rubber (a4) | (part) | — | 100 | — | — | — |
| Nitrile-group-containing highly saturated copolymer rubber (b1) | (part) | — | — | 100 | — | 50 |
| Nitrile-group-containing highly saturated copolymer rubber (b2) | (part) | — | — | — | 100 | — |
| N774 Carbon Black | (part) | 50 | 50 | 50 | 50 | 50 |
| Zinc methacrylate | (part) | — | — | — | — | — |
| ADK Cizer C-8 (plasticizer) | (part) | 5 | 5 | 5 | 5 | 5 |
| Nocrac CD (antiaging agent) | (part) | 1.5 | 1.5 | 1.5 | 1.5 | 1.5 |
| Technora DCF 3 mm (staple fibers) | (part) | 3 | 3 | 3 | 3 | — |
| Technora DCF 6 mm (staple fibers) | (part) | — | — | — | — | — |
| Vul Cup 40KE (cross-linking agent) | (part) | 8 | 8 | 8 | 8 | 8 |
| Workability | | | | | | |
| Compound Mooney ($ML_{1+4}$, 100° C.) | | 102 | 84 | 39 | 38 | 69 |
| Sticking at dump out | | G | G | P | P | G |
| Normal physical properties | | | | | | |
| Tensile strength | (MPa) | 22.8 | 22.1 | 21.5 | 21.3 | 23.2 |
| Elongation | (%) | 340 | 370 | 340 | 320 | 400 |
| 10% tensile stress | (MPa) | 2.0 | 1.2 | 7.4 | 7.1 | 0.5 |
| 20% tensile stress | (MPa) | 5.1 | 3.0 | 8.0 | 8.0 | 0.9 |
| 100% tensile stress | (MPa) | 9.0 | 8.5 | 8.5 | 7.8 | 3.3 |
| Hardness (DURO A) | | 77 | 76 | 77 | 77 | 71 |
| Heat buildup property (relative index to Comparative Example 1 as 100) | | | | | | |
| tan δ (relative index) | | 105 | 116 | 118 | 118 | 121 |

From Table 1, a nitrile group-containing highly saturated copolymer rubber composition which comprises a nitrile group-containing highly saturated copolymer rubber (A) having a Mooney viscosity [$ML_{1+4}$, 100° C.] of 50 to 200, a nitrile group-containing highly saturated copolymer rubber (B) having a Mooney viscosity [$ML_{1+4}$, 100° C.] of 5 to 45, and staple fibers (C) having an average fiber length of 0.1 to 12 mm was superior in workability (compound Mooney was low and sticking at time of dump out was low) and, further, the obtained cross-linked rubber was extremely high in tensile stress and was excellent in low heat buildup property (Examples 1 to 8). Note that, when adding a zinc salt of methacrylic acid, not only were the tensile strength and tensile stress further improved, but also the low heat buildup property became much more superior (Examples 7 and 8).

On the other hand, when using only a nitrile group-containing highly saturated copolymer rubber having a Mooney viscosity [$ML_{1+4}$, 100° C.] of 50 to 200 and not using a nitrile group-containing highly saturated copolymer rubber having a Mooney viscosity [$ML_{1+4}$, 100° C.] of 5 to 45, the rubber composition was not good in workability (Comparative Examples 1 to 3), the obtained cross-linked rubber was inferior in tensile stress (Comparative Examples 1 to 4), and the low heat buildup property was sometimes poor (Comparative Example 4).

Further, when using only a nitrile group-containing highly saturated copolymer rubber having a Mooney viscosity [$ML_{1+4}$, 100° C.] of 5 to 45 and not using a nitrile group-containing highly saturated copolymer rubber having a Mooney viscosity [$ML_{1+4}$, 100° C.] of 50 to 200, the rubber composition was not good in workability (the stickiness at of dump out was poor), the obtained cross-linked rubber was inferior in low heat buildup property, and the tensile stress was also not sufficient (Comparative Examples 5 and 6).

Furthermore, when not mixing aramide staple fibers, the obtained cross-linked rubber became remarkably low in tensile stress and the low heat buildup property also became inferior as a result (Comparative Example 7).

The invention claimed is:

1. A nitrile group-containing highly saturated copolymer rubber composition containing a nitrile group-containing highly saturated copolymer rubber (A) having a Mooney viscosity ML1+4, 100° C. of 50 to 200, a nitrile group-containing highly saturated copolymer rubber (B) having a Mooney viscosity ML1+4, 100° C. of 5 to 45, and staple fibers (C) having an average fiber length of 0.1 to 12 mm,
    wherein said nitrile group-containing highly saturated copolymer rubber (A) and said nitrile group-containing highly saturated copolymer rubber (B) both have iodine values of 10 or less.

2. The nitrile group-containing highly saturated copolymer rubber composition as set forth in claim 1 containing said nitrile group-containing highly saturated copolymer rubber (B) in 5 to 75 wt % with respect to 100 wt % of the total of said nitrile group-containing highly saturated copolymer rubber (A) and said nitrile group-containing highly saturated copolymer rubber (B).

3. The nitrile group-containing highly saturated copolymer rubber composition as set forth in claim 1 containing said staple fibers (C) in 0.1 to 50 parts by weight with respect to 100 parts by weight of the total of said nitrile group-containing highly saturated copolymer rubber (A) and said nitrile group-containing highly saturated copolymer rubber (B).

4. The nitrile group-containing highly saturated copolymer rubber composition as set forth in claim 1 further containing an α,β-ethylenically unsaturated carboxylic acid metal salt (D).

5. A cross-linkable nitrile rubber composition which comprises the nitrile group-containing highly saturated copolymer rubber composition as set forth in claim 1 in which a cross-linking agent is contained.

6. A cross-linked rubber obtained by cross-linking the cross-linkable nitrile rubber composition as set forth in claim 5.

7. The nitrile group-containing highly saturated copolymer rubber composition as set forth in claim 1 wherein said nitrile group-containing highly saturated copolymer rubber (A) has a Mooney viscosity of 50 to 120.

8. The nitrile group-containing highly saturated copolymer rubber composition as set forth in claim 1 wherein said nitrile group-containing highly saturated copolymer rubber (A) has a Mooney viscosity of 60 to 110.

9. The nitrile group-containing highly saturated copolymer rubber composition as set forth in claim 1 wherein said nitrile group-containing highly saturated copolymer rubber (B) has a Mooney viscosity of 10 to 40.

10. The nitrile group-containing highly saturated copolymer rubber composition as set forth in claim 1 containing said nitrile group-containing highly saturated copolymer rubber (B) in 15 to 75 wt % with respect to 100 wt % of the total of said nitrile group-containing highly saturated copolymer rubber (A) and said nitrile group-containing highly saturated copolymer rubber (B).

11. The nitrile group-containing highly saturated copolymer rubber composition as set forth in claim 1 containing said staple fibers (C) in 0.5 to 20 parts by weight with respect to 100 parts by weight of the total of said nitrile group-containing highly saturated copolymer rubber (A) and said nitrile group-containing highly saturated copolymer rubber (B).

12. The nitrile group-containing highly saturated copolymer rubber composition as set forth in claim 1 containing said staple fibers (C) in 1 to 10 parts by weight with respect to 100 parts by weight of the total of said nitrile group-containing highly saturated copolymer rubber (A) and said nitrile group-containing highly saturated copolymer rubber (B).

13. The nitrile group-containing highly saturated copolymer rubber composition as set forth in claim 8 wherein said nitrile group-containing highly saturated copolymer rubber (B) has a Mooney viscosity of 10 to 40.

\* \* \* \* \*